US012783085B2

(12) United States Patent
Tseng-Kuo et al.

(10) Patent No.: US 12,783,085 B2
(45) Date of Patent: Nov. 3, 2026

(54) TOUCH SENSING SYSTEM FOR ADJUSTING UPLINK SIGNAL FREQUENCY BASED ON OPERATION MODES

(71) Applicant: Novatek Microelectronics Corp., Hsinchu (TW)

(72) Inventors: Ting Tseng-Kuo, Hsinchu County (TW); Hsiang-Cheng Yu, Hsinchu County (TW); Chi-Yu Ou, Hsinchu City (TW); Chin-Lin Lee, Hsinchu City (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 19/171,332

(22) Filed: Apr. 6, 2025

(65) Prior Publication Data

US 2026/0140588 A1 May 21, 2026

(30) Foreign Application Priority Data

Nov. 20, 2024 (TW) ................................ 113144611

(51) Int. Cl.
*G06F 3/041* (2006.01)

(52) U.S. Cl.
CPC ........ *G06F 3/0418* (2013.01); *G06F 3/04162* (2019.05); *G06F 3/04166* (2019.05)

(58) Field of Classification Search
CPC ..................................................... G06F 3/0418
USPC .......................................................... 345/178
See application file for complete search history.

(56) References Cited

U.S. PATENT DOCUMENTS

| | | | |
|---|---|---|---|
| 11,500,481 B1 | 11/2022 | Hung et al. | |
| 12,307,027 B2 | 5/2025 | Cheng et al. | |
| 12,346,507 B2 | 7/2025 | Cheng et al. | |
| 2020/0133457 A1 | 4/2020 | Chen et al. | |
| 2023/0214052 A1* | 7/2023 | Lee | G06F 3/0443 345/174 |
| 2023/0236677 A1 | 7/2023 | Cheng et al. | |
| 2023/0409146 A1 | 12/2023 | Kim et al. | |
| 2024/0012493 A1 | 1/2024 | Cheng et al. | |
| 2024/0094841 A1 | 3/2024 | Li et al. | |
| 2024/0160317 A1 | 5/2024 | Jang et al. | |
| 2024/0248568 A1 | 7/2024 | Miyamoto | |

FOREIGN PATENT DOCUMENTS

| | | |
|---|---|---|
| CN | 116501180 | 7/2023 |
| TW | M617533 | 9/2021 |

OTHER PUBLICATIONS

"Office Action of Taiwan Counterpart Application", issued on Sep. 10, 2025, p. 1-p. 4.

* cited by examiner

*Primary Examiner* — Long D Pham
(74) *Attorney, Agent, or Firm* — JCIPRNET

(57) ABSTRACT

A touch sensing system including a touch sensing apparatus and a stylus is provided. The touch sensing apparatus includes a driver circuit and a touch sensing panel. The driver circuit drives the touch sensor panel to output an uplink signal. The stylus outputs a downlink signal to the touch sensor panel according to the uplink signal. The driver circuit adjusts a frequency of the uplink signal according to an operation mode of the touch sensing apparatus.

9 Claims, 6 Drawing Sheets

TOUCH SENSING SYSTEM FOR ADJUSTING UPLINK SIGNAL FREQUENCY BASED ON OPERATION MODES

CROSS-REFERENCE TO RELATED APPLICATION

This application claims the priority benefit of Taiwan application serial no. 113144611 filed on Nov. 20, 2024. The entirety of the above-mentioned patent application is hereby incorporated by reference herein and made a part of this specification.

BACKGROUND

Technical Field

The disclosure relates to an electronic system and an electronic apparatus, and more particularly, to a touch sensing system and a touch sensing apparatus.

Description of Related Art

A touch sensing apparatus may be equipped with a stylus for operation to provide users with different experiences. Generally speaking, the stylus will output s downlink signal at a fixed time. At this time, a touch chip is required to give up the time originally used for finger scanning and change it to the time for receiving the downlink signal, to perform decoding on the downlink signal and coordinate report processing of the stylus.

Therefore, an application of the stylus is often limited by time. For example, a scanning rate for fingers in a pen mode is low, or a report rate of the stylus may not be improved. For another example, in the pen mode, a signal is susceptible to noise interference, causing erroneous reporting of hand coordinates or pen coordinates.

SUMMARY

The disclosure provides a touch sensing system including a touch sensing apparatus, in which a touch chip may determine what kind of application to be performed to adjust a frequency of an uplink signal, thereby increasing application flexibility of the touch sensing panel. In addition, a provided operation method does not affect pairing time of a stylus.

An embodiment of the disclosure provides a touch sensing system, including a touch sensing apparatus and a stylus. The touch sensing apparatus includes a driver circuit and a touch sensing panel. The driver circuit is used to drive the touch sensing panel to output an uplink signal. The stylus is used to output a downlink signal to the touch sensing panel according to the uplink signal. The driver circuit adjusts a frequency of the uplink signal according to an operation mode of the touch sensing apparatus.

An embodiment of the disclosure provides a touch sensing apparatus and a stylus. The touch sensing apparatus includes a driver circuit and a touch sensing panel. The touch sensing panel is used to output an uplink signal and receive a downlink signal. The stylus is used to output the downlink signal to the touch sensing panel according to the uplink signal. The driver circuit is used to drive the touch sensing panel to output the uplink signal. The driver circuit adjusts a frequency of the uplink signal according to an operation mode of the touch sensing apparatus.

In order for the aforementioned features and advantages of the disclosure to be more comprehensible, embodiments accompanied with drawings are described in detail below.

DETAILED DESCRIPTION OF DISCLOSED EMBODIMENTS

Each of the following embodiments are provided to describe the disclosure in detail, but the disclosure is not limited to the provided embodiments, and the provided embodiments may be suitably combined. The term "coupled/coupled" or "connected/connected" used in the specification of this application (including the claims) may refer to any direct or indirect connection means. For example, "a first apparatus is coupled to a second apparatus" should be interpreted as "the first apparatus is directly connected to the second apparatus" or "the first apparatus is indirectly connected to the second apparatus through other apparatuses or connection means". In addition, the term "signal" may refer to current, voltage, charge, temperature, data, electromagnetic wave, or any one or more signals.

Figure 1:
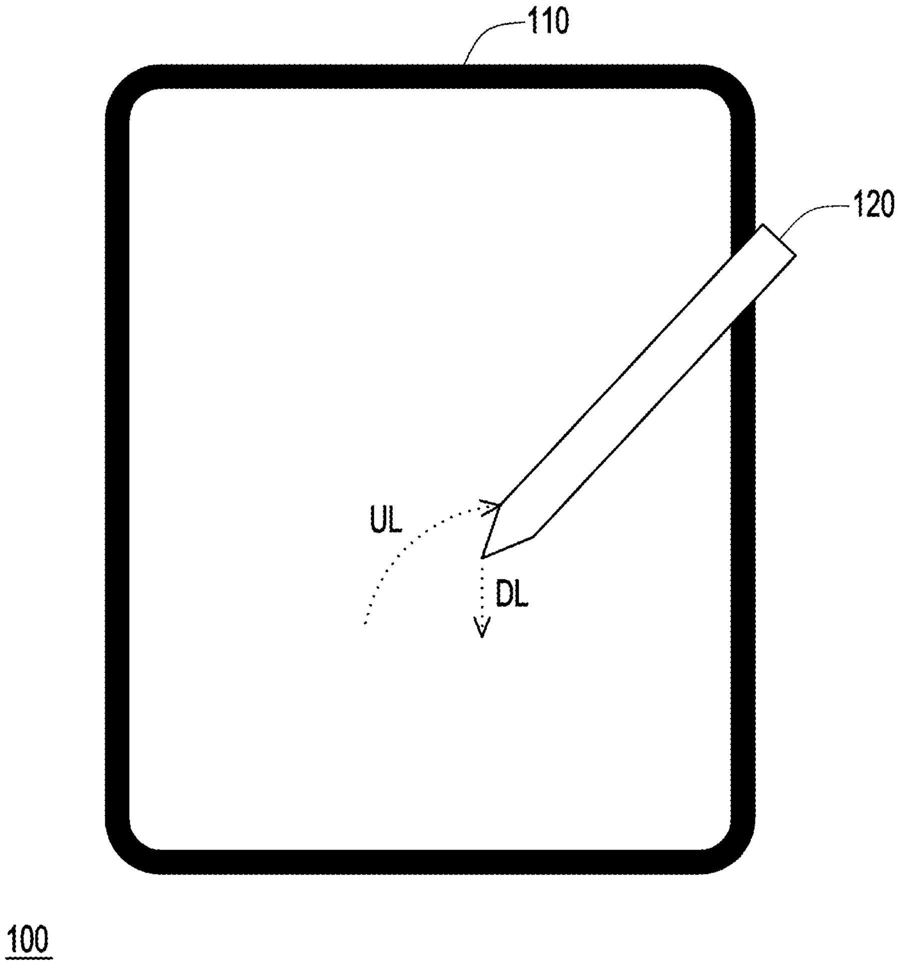
FIG. 1 is a schematic diagram of a touch sensing system according to an embodiment of the disclosure.
Figure 2:
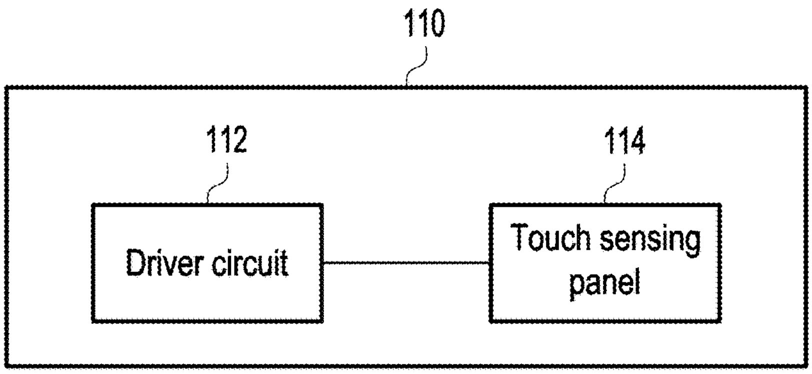
FIG. 2 is a schematic block diagram of a touch sensing apparatus according to the embodiment of FIG. 1.

FIG. 1 is a schematic diagram of a touch sensing system according to an embodiment of the disclosure. FIG. 2 is a schematic block diagram of a touch sensing apparatus according to the embodiment of FIG. 1. Referring to FIGS. 1 and 2, a touch sensing system 100 includes a touch sensing apparatus 110 and a stylus 120. The touch sensing apparatus 110 includes a driver circuit 112 and a touch sensing panel 114. The touch sensing apparatus 110 has a touch sensing function and a display function. The driver circuit 112 is used to drive the touch sensing panel 114 to perform a touch sensing operation and a display operation. Hardware structures and implementations of the driver circuit 112, the touch sensing panel 114, and the stylus 120 may be obtained from the common knowledge in the art with sufficient teaching, suggestion and implementation.

The touch sensing apparatus 110 may be used to detect whether the stylus 120 exists and various operations of the stylus 120 on the touch sensing panel 114. In addition, the touch sensing apparatus 110 may also be used to detect a touch event of a user. The touch event is, for example, a touch operation in which the user does not use the stylus 120 but directly touches the touch sensing panel 114 with a finger.

The driver circuit 112 is used to drive the touch sensing panel 114 to output an uplink signal UL to detect the stylus 120 or the touch event. The stylus 120 receives the uplink signal UL and outputs a downlink signal DL to the touch sensing panel 114 accordingly. The driver circuit 112 may determine whether the stylus 120 exists and various operations of the stylus 120 on the touch sensing panel 114 according to the downstream signal DL.

Figure 3:
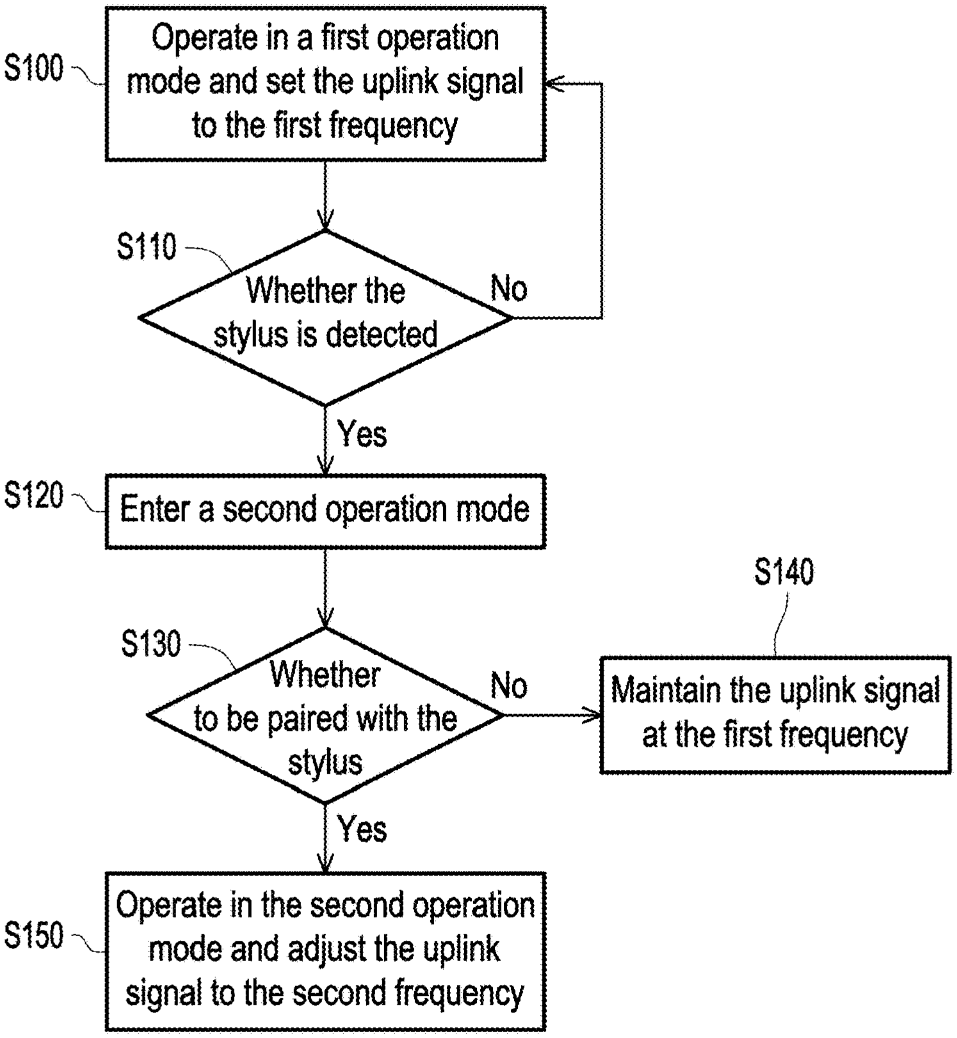
FIG. 3 is a schematic diagram of an operation method of a touch sensing apparatus according to an embodiment of the disclosure.

Specifically, FIG. 3 is a schematic diagram of an operation method of a touch sensing apparatus according to an embodiment of the disclosure. Referring to FIGS. 1 to 3, in step S100, the touch sensing apparatus 110 operates in a first operation mode. The first operation mode is, for example, a pen detection mode. The touch sensing apparatus 110 may be used to detect whether the stylus 120 exists in the first operation mode.

Figure 4A:
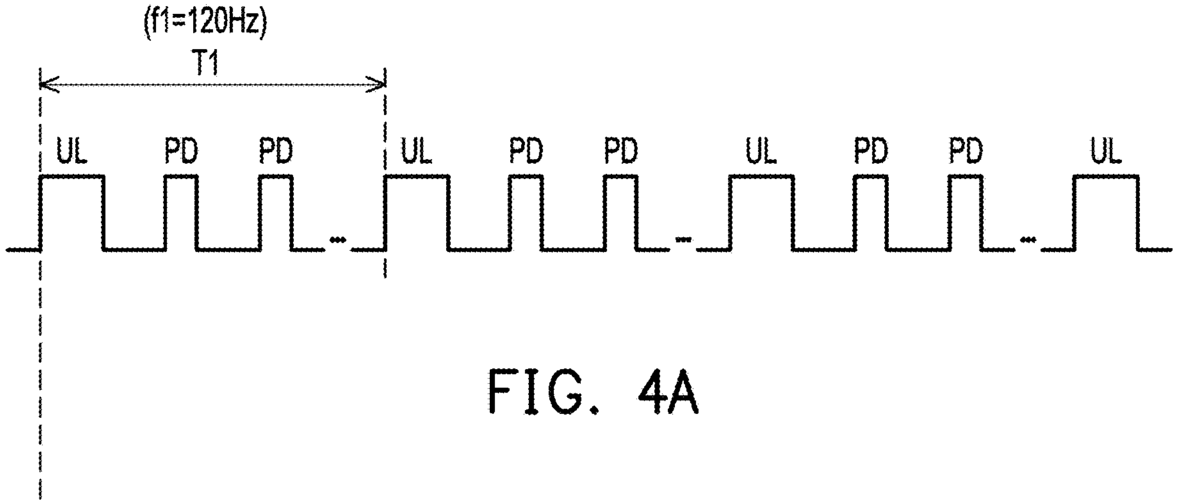
FIGS. 4A and 4B is a schematic diagram of an operation signal according to an embodiment of the disclosure.
Figure 4B:
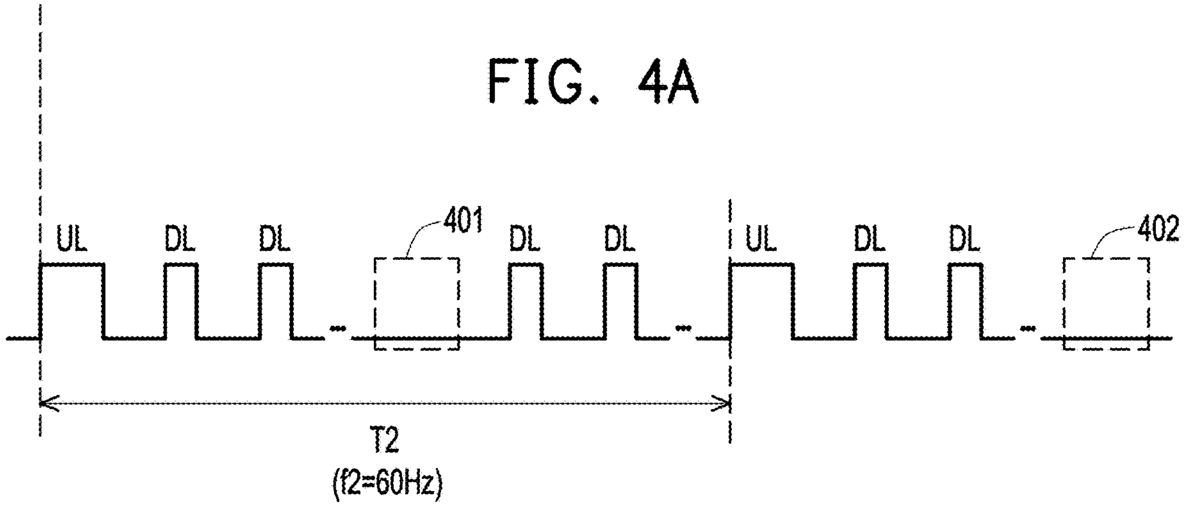

FIGS. 4A and 4B is a schematic diagram of an operation signal according to an embodiment of the disclosure. Referring to both FIGS. 4A and 4B together, FIG. 4A shows that the touch sensing apparatus 110 periodically outputs the uplink signal UL in the first operation mode. Every two uplink signals UL are one frame. In this embodiment, a time length of each of frames T1 is, for example, 8.3 milliseconds (ms), and a frequency f1 of the uplink signal UL is, for example, 120 Hertz (Hz). The above frame time and frequency value are only for illustration and are not intended to limit the disclosure.

That is to say, in this embodiment, when the touch sensing apparatus 110 operates in the first operation mode, the driver circuit 112 sets the uplink signal UL to have the first frequency f1, and drives the touch sensing panel 114 to output the uplink signal UL having the first frequency f1 to detect whether the stylus 120 exists.

Each of frame periods includes multiple pen detection periods PD. In step S110, the driver circuit 112 detects whether the stylus 120 exists during the pen detection period. If the driver circuit 112 detects that the stylus 120 does not exist, the driver circuit 112 will return to step S100 to drive the touch sensing apparatus 110 to continuously detect whether the stylus 120 exists. If the driver circuit 112 detects that the stylus 120 exists, the driver circuit 112 will perform step S120 to drive the touch sensing apparatus 110 to enter a second operation mode.

In this embodiment, the second operation mode is, for example, a pen mode. The touch sensing apparatus 110 may be used to detect various operations of the stylus 120 on the touch sensing panel 114 in the second operation mode.

In step S130, the driver circuit 112 determines whether the touch sensing apparatus 110 is paired with the stylus 120. If the touch sensing apparatus 110 is not paired with the stylus 120, the driver circuit 112 will perform step S140 to maintain the uplink signal UL at the first frequency f1 to be continuously paired with the stylus 120. In steps S100 and S140, since the uplink signal UL is maintained at the first frequency f1, detection and pairing of the stylus 120 is not affected.

If the touch apparatus device 110 is paired with the stylus 120, the driver circuit 112 will perform step S150 to drive the touch sensing apparatus 110 to operate in the second operation mode. In the second operation mode, the touch sensing apparatus 110 adjusts a frequency of the uplink signal UL and periodically outputs the uplink signal UL, as shown in FIG. 4B. The touch sensing apparatus 110 adjusts the frequency of the uplink signal UL from the higher first frequency f1 to a lower second frequency f2.

In this embodiment, time of each of frames T2 is, for example, 16.6 ms, and the frequency f2 of the uplink signal UL is, for example, 60 Hz. The above frame time and frequency value are only for illustration and are not intended to limit the disclosure.

That is to say, in this embodiment, when the touch sensing apparatus 110 operates in the second operation mode, the driver circuit 112 sets the uplink signal UL to have the second frequency f2, and drives the touch sensing panel 114 to output the uplink signal UL having the second frequency f2. The first frequency f1 is greater than the second frequency f2.

On the other hand, in FIG. 4B, between every two of the uplink signals UL, the stylus 120 outputs the downlink signal DL to the touch sensing panel 114 after receiving the uplink signal UL, so that the driver circuit 112 may detect various operations of the stylus 120 on the touch sensing panel 114 accordingly.

Therefore, in this embodiment, the driver circuit 112 may adjust the frequency of the uplink signal UL according to whether the touch sensing apparatus 110 operates in the first operation mode or the second operation mode. Time 401 and time 402 originally used to output UL1 may be used for other purposes. For example, the driver circuit 112 outputs a signal for finger scanning, or the driver circuit 112 receives the downlink signal DL sent by the stylus 120. In one embodiment, the driver circuit 112 may also perform noise detection at time 401 and time 402 of the second operation mode.

Figure 5:
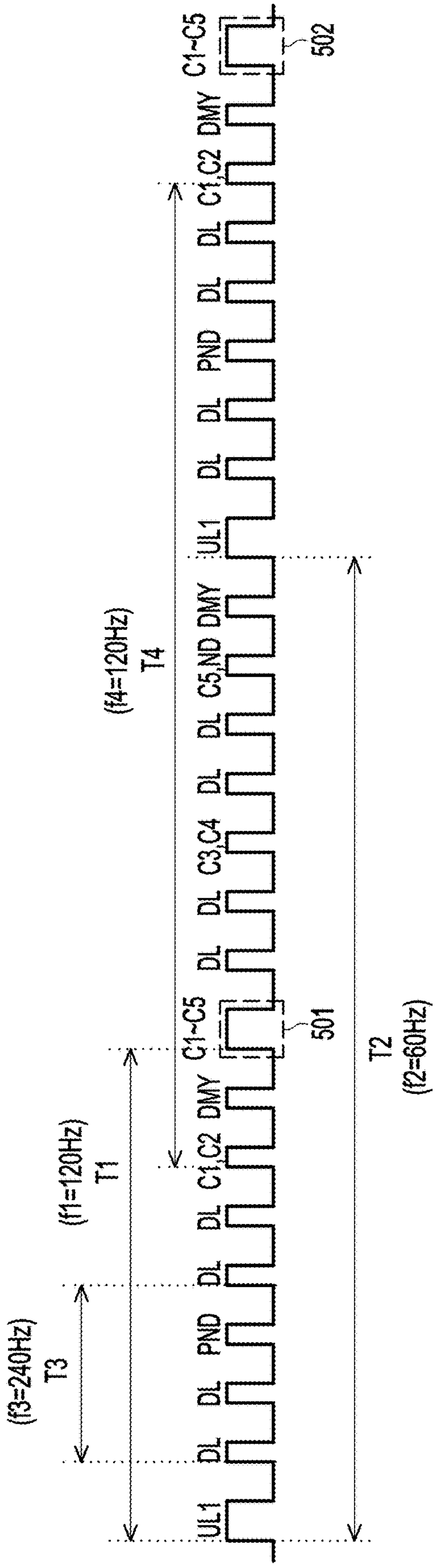
FIG. 5 is a schematic diagram of each of operation signals of a touch sensing apparatus operating in a second operation mode according to an embodiment of the disclosure.
Figure 6:
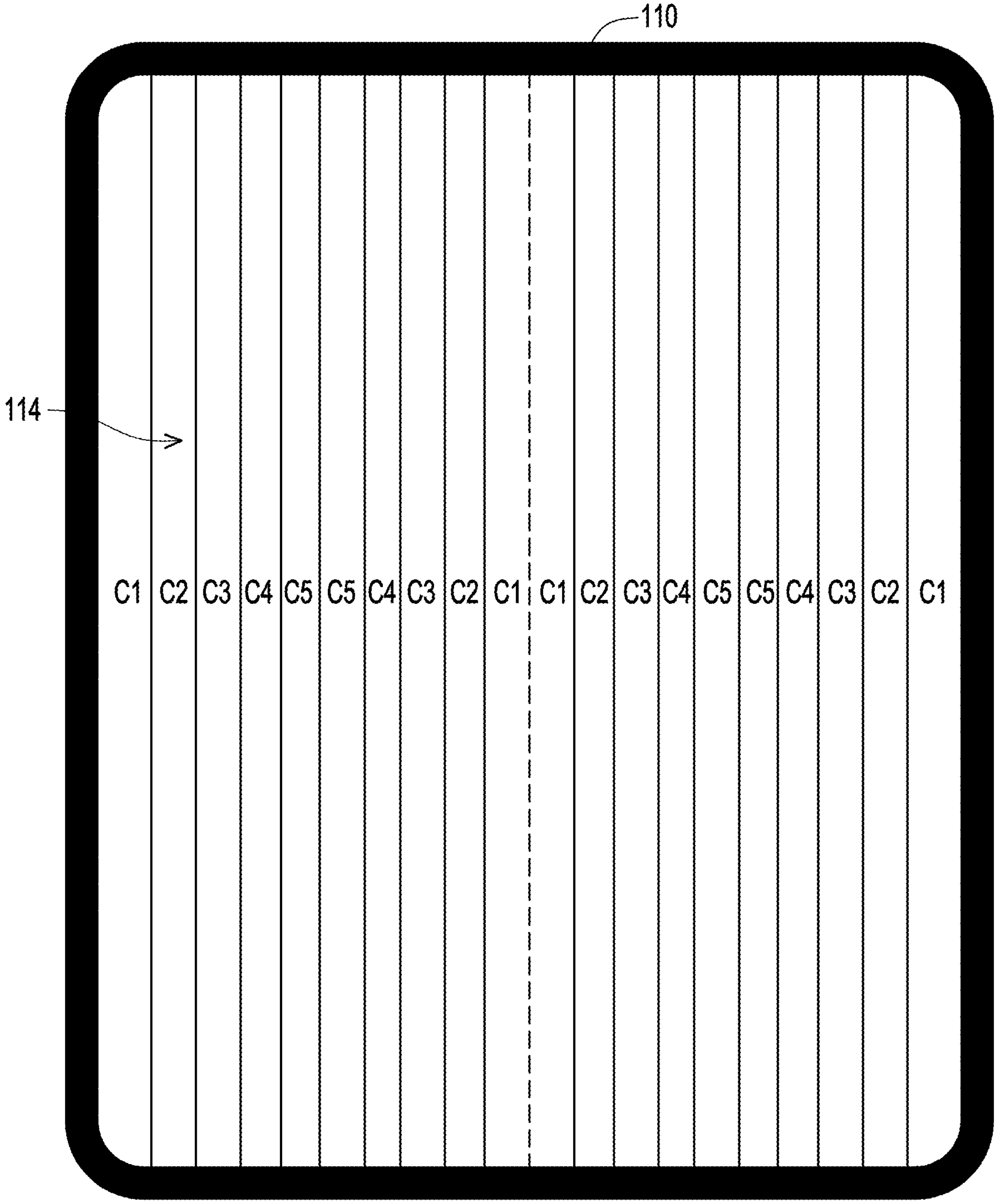
FIG. 6 is a schematic diagram of partition scanning of a touch sensing panel according to the embodiment of FIG. 1.

FIG. 5 is a schematic diagram of each of operation signals of a touch sensing apparatus operating in a second operation mode according to an embodiment of the disclosure. FIG. 6 is a schematic diagram of partition scanning of a touch sensing panel according to the embodiment of FIG. 1. Referring to FIGS. 5 and 6, FIG. 6 shows that the touch sensing panel 114 is divided into multiple areas. C1 to C5 represent driving signals used to drive the areas. A partitioning method of the touch sensing panel in the disclosure is not limited to a configuration in FIG. 6.

In FIG. 5, the driver circuit 112 adjusts the uplink signal UL to the lower second frequency f2 in the second operating mode. At time 501 and time 502, the touch sensing panel 114 originally outputs the uplink signal UL in the first operation mode, and instead outputs the driving signals C1 to C5 in the second operation mode to increase a scanning rate of the touch event. Therefore, in the second operation mode, scanning time T4 used to detect the finger is 16.67 ms, but within the scanning time T4, the driving signals C1 to C5 are scanned twice. Therefore, with an average scan every 8.3 ms, a scanning rate f4 is increased to 120 Hz. Values of the above scanning time and scanning rate are not intended to limit the disclosure. Therefore, in this embodiment, the scanning rate of the touch event in the second operation mode is greater than the scanning rate of the touch event in the first operation mode.

In addition, in FIG. 5, a signal PND indicates that the driver circuit 112 detects pen noise during the signal period, and a signal DMY indicates that the driver circuit 112 performs a signal transmission operation during the signal period. The signal DMY may be optionally configured. In a large-size panel, multiple driving chips may be disposed to drive different panel areas. Therefore, the driving chips require signal transmission between each other to exchange touch sensing information.

Figure 7:
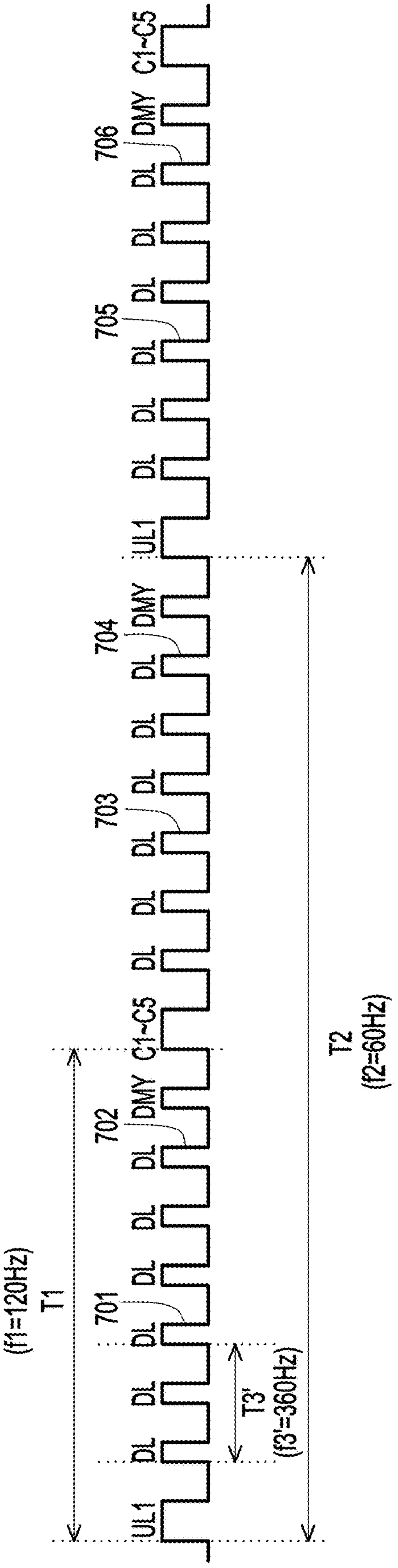
FIG. 7 is a schematic diagram of each of operation signals of a touch sensing apparatus operating in a second operation mode according to another embodiment of the disclosure.

FIG. 7 is a schematic diagram of each of operation signals of a touch sensing apparatus operating in a second operation mode according to another embodiment of the disclosure. Referring to FIG. 7, in the second operation mode, the driver circuit 112 may adjust a scanning rate f3' of the stylus 120 to be greater than a scanning rate f3 in the second operation mode of FIG. 5 to increase a report rate of the stylus 120.

Specifically, at time 701 and time705 of the second operation mode, the driver circuit 112 originally detects the pen noise during a period of the signal PND, and the driver circuit 112 receives the downlink signal DL instead. Similarly, at time 702 to time 704 and time 706, the driver circuit 112 originally performs panel scanning and noise detection during periods of the signals C1 to C5 and ND, and in the second operation mode, the driver circuit 112 also receives the downlink signal DL instead. As a result, in the second operation mode, scanning time T3' may be shortened to 2.77 ms, and the scanning rate f3' of the stylus 120 is increased to 360 Hz to increase the report rate of the stylus 120. The values of the above scanning time and scanning rate are not intended to limit the disclosure. Therefore, in this embodiment, a scanning rate of the stylus 120 in the second operation mode is greater than the scanning rate of the stylus 120 in the first operation mode.

Since the driver circuit 112 receives two downlink signals DL and may report a complete two-dimensional coordinate, in FIG. 5, each of the frames T1 includes 4 downlink signals DL, in which 2 sets of coordinates may be obtained, and a coordinate report rate is 240 Hz. In FIG. 7, each of the frames T1 includes 6 downlink signals DL, in which 3 sets of coordinates may be obtained, and the coordinate report rate is increased to 360 Hz. Therefore, in the embodiment of FIG. 7, the driver circuit 112 may improve the report rate by changing the operation originally performed during the periods of the signals PND, C1 to C5, and ND to receiving the downlink signal DL.

Based on the above, in embodiments of the disclosure, the touch sensing apparatus may omit a portion of the uplink signal in the second operation mode, and the driver circuit determines what kind of application to be performed, which increases flexibility of the application of the touch sensing panel. In addition, the operation method provided in the embodiment of the disclosure does not affect the pairing time of the stylus.

Although the disclosure has been described with reference to the above embodiments, they are not intended to limit the disclosure. It will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:

1. A touch sensing system, comprising:

a touch sensing apparatus comprising a driver circuit and a touch sensing panel, wherein the driver circuit drives the touch sensing panel to output an uplink signal; and a stylus to output a downlink signal to the touch sensing panel according to the uplink signal, wherein the driver circuit adjusts a frequency of the uplink signal according to an operation mode of the touch sensing apparatus, wherein when the touch sensing apparatus operates in a second operation mode switched from a first operation mode, the driver circuit performs a selected operation during a time corresponding to a time for outputting the uplink signal in the first operation mode, wherein the selected operation comprises a noise detection operation.

2. The touch sensing system according to claim 1, wherein when the touch sensing apparatus operates in the first operation mode, the driver circuit sets the uplink signal to have a first frequency, and drives the touch sensing panel to output the uplink signal having the first frequency signal.

3. The touch sensing system according to claim 2, wherein when the touch sensing apparatus operates in a second operating mode, the driver circuit sets the uplink signal to have a second frequency, and the driver circuit drives the touch sensing panel to output the uplink signal having the second frequency, wherein the first frequency is different from the second frequency.

4. The touch sensing system according to claim 3, wherein the first frequency is greater than the second frequency.

5. The touch sensing system according to claim 1, wherein the driver circuit adjusts a scanning rate of the stylus according to the operation mode of the touch sensing apparatus.

6. The touch sensing system according to claim 5, wherein the operation mode of the touch sensing apparatus comprises the first operation mode and the second operation mode, and the scanning rate of the stylus in the second operation mode is greater than the scanning rate of the stylus in the first operation mode.

7. The touch sensing system according to claim 1, wherein the driver circuit adjusts a scanning rate of a touch event according to the operation mode of the touch sensing apparatus.

8. The touch sensing system according to claim 7, wherein the operation mode of the touch sensing apparatus comprises the first operation mode and the second operation mode, and the scanning rate of the touch event in the second operation mode is greater than the scanning rate of the touch event in the first operation mode.

9. A touch sensing apparatus, comprising:

a touch sensing panel used to output an uplink signal and receive a downlink signal, wherein a stylus is used to output the downlink signal to the touch sensing panel according to the uplink signal; and a driver circuit coupled to the touch sensing panel and used to drive the touch sensing panel to output the uplink signal, wherein the driver circuit adjusts a frequency of the uplink signal according to an operation mode of the touch sensing apparatus, wherein when the touch sensing apparatus operates in a second operation mode switched from a first operation mode, the driver circuit performs a selected operation during a time corresponding to a time for outputting the uplink signal in the first operation mode, wherein the selected operation comprises a noise detection operation.

* * * * *